United States Patent
Hisada et al.

(10) Patent No.: US 12,516,498 B2
(45) Date of Patent: Jan. 6, 2026

(54) DRIVE TRANSMISSION DEVICE AND CONSTRUCTION MACHINE, AND METHOD OF ASSEMBLING CONSTRUCTION MACHINE

(71) Applicant: Nabtesco Corporation, Tokyo (JP)

(72) Inventors: Kazuki Hisada, Tokyo (JP); Etsuro Komori, Tokyo (JP)

(73) Assignee: NABTESCO CORPORATION, Tokyo (JP)

( * ) Notice: Subject to any disclaimer, the term of this patent is extended or adjusted under 35 U.S.C. 154(b) by 504 days.

(21) Appl. No.: 17/974,062

(22) Filed: Oct. 26, 2022

(65) Prior Publication Data

US 2023/0183940 A1   Jun. 15, 2023

(30) Foreign Application Priority Data

Dec. 6, 2021 (JP) .................... 2021-197865

(51) Int. Cl.
  *E02F 9/08*  (2006.01)
  *E02F 3/42*  (2006.01)
  (Continued)

(52) U.S. Cl.
  CPC ............ *E02F 9/0866* (2013.01); *E02F 3/425* (2013.01); *E02F 9/006* (2013.01); *F16H 57/021* (2013.01); *F16H 2057/02082* (2013.01)

(58) Field of Classification Search
  CPC ......... E02F 3/425; E02F 9/006; E02F 9/0866; F16H 57/021
  See application file for complete search history.

(56) References Cited

U.S. PATENT DOCUMENTS 3,976,211 A    8/1976  Baron et al.
11,434,808 B2 *  9/2022  Akiyama ............... B60K 11/02
(Continued)

FOREIGN PATENT DOCUMENTS

DE    1168342 B    4/1964
GB    323771 A     1/1930
(Continued)

OTHER PUBLICATIONS

Extended European Search Report dated May 19, 2023, issued in corresponding European Patent Application No. 22203822.6 (7 pgs.).

(Continued)

*Primary Examiner* — Saul Rodriguez
*Assistant Examiner* — Brendan P Tighe
(74) *Attorney, Agent, or Firm* — Pillsbury Winthrop Shaw Pittman, LLP

(57) ABSTRACT

A drive transmission device of the present disclosure includes a first member and a second member, a drive source, two bracket portions, a shaft portion, a reduction unit having an output portion, and a housing portion. The first member and the second member are coupled to each other so as to be rotatable about a rotation axis. The two bracket portions are provided on the second member and are spaced apart from and opposed to each other. The shaft portion is connected to the first member and positioned between the bracket portions. The output portion is attached to the shaft portion and attached to an opposed surface of a first bracket portion. The housing portion is coupled to the shaft portion so as to be rotatable about the rotation axis, the housing portion being attached to an opposed surface of a second bracket portion.

11 Claims, 10 Drawing Sheets

(51) Int. Cl.
  *E02F 9/00* (2006.01)
  *F16H 57/021* (2012.01)
  *F16H 57/02* (2012.01)

(56) References Cited

U.S. PATENT DOCUMENTS

| | | | |
|---|---|---|---|
| 11,566,558 B2 * | 1/2023 | Yamaguchi | F01P 3/20 |
| 11,635,085 B2 * | 4/2023 | Akiyama | F01P 7/042 |
| | | | 415/122.1 |
| 2018/0371980 A1 * | 12/2018 | Minagawa | F01P 5/04 |
| 2020/0292049 A1 * | 9/2020 | Torisu | F16H 57/037 |
| 2022/0316183 A1 | 10/2022 | Hisada et al. | |

FOREIGN PATENT DOCUMENTS

| | | | | |
|---|---|---|---|---|
| JP | 63-300131 A | | 12/1988 | |
| JP | 2021088834 A | * | 6/2021 | E02F 3/382 |
| WO | 2010/122951 A1 | | 10/2010 | |

OTHER PUBLICATIONS

First Office Action dated May 15, 2025 issued in corresponding Chinese Patent Application No. 202211327295.4 with English translation (15 pgs.).

* cited by examiner

DRIVE TRANSMISSION DEVICE AND CONSTRUCTION MACHINE, AND METHOD OF ASSEMBLING CONSTRUCTION MACHINE

CROSS-REFERENCE TO RELATED APPLICATIONS

The present application is based on and claims the benefit of priority from Japanese Patent Application Serial No. 2021-197865 (filed on Dec. 6, 2021), the contents of which are hereby incorporated by reference in their entirety.

TECHNICAL FIELD

The present disclosure relates to a drive transmission device and a construction machine, and a method of assembling the construction machine. In particular, the present disclosure relates to structure of joint actuators for excavators and a technique suitable for a sealing mechanism.

BACKGROUND

Construction machines such as an excavator includes a self-propelled undercarriage and a slewable upper structure provided on top of the undercarriage. See, for example, Patent Literature 1: Japanese Patent Application Publication No. Sho 63-300131. The slewable upper structure includes a cab for an operator. One end of an operating unit is rotatably (swingably) coupled to the slewable upper structure. The operating unit includes, for example, a boom, an arm rotatably coupled to the boom, and a bucket rotatably coupled to the arm. One end of the arm is rotatably coupled to the other end of the boom (the end facing away from the slewable upper structure). The bucket is rotatably coupled to the other end of the arm (the end facing away from the boom).

In many cases, a hydraulic actuator having a linear motion mechanism is provided as a drive transmission device in the coupling portion between the slewable upper structure and the boom, the coupling portion between the boom and the arm, and the coupling portion between the arm and the bucket. Driving the hydraulic actuators can cause the slewable upper structure to rotate relative to the undercarriage and cause the boom, arm, and bucket to swing. In recent years, electrification of construction machinery is desired from the viewpoint of structural simplification. It has been proposed to use electric actuators as the drive transmission devices. In Patent Literature 1, for example, a hydraulic actuator is replaced with an electric cylinder with a linear motion mechanism having a ball-screw type speed changer (speed reducer) provided therein. Further, as electrification advances, rotary actuators are being used as speed reducers (reduction units).

Each coupling portion of a construction machine tends to be heavily loaded depending on its service environment. For this reason, the actuator, in particular the speed changer needs to have sufficient mechanical strength to withstand the heavy load. An electric actuator may be, for example, a linear actuator or a rotary actuator, depending on the cases. However, a linear actuator is inefficient because it does not work when the direction of thrust is not perpendicular to an input lever. In contrast, a rotary actuator is more efficient because it works regardless of the direction of the input lever.

However, when a rotary actuator is used, radial and moment loads tend to occur. Therefore, when rotary actuators are installed (in particular, when the speed reducer is installed on only one side), the radial and moment loads are unbalanced. Therefore, the actuator needs to be larger in order to achieve the required strength. If the increase in the size of the actuator is inhibited, the life of the speed reducer could be shortened.

SUMMARY

The present disclosure provides a drive transmission device and a construction machine, and a method of assembling the construction machine, capable of reducing loads such as a radial load and a moment load while inhibiting increase in the size.

(1) A drive transmission device according to one aspect of the present disclosure comprises: a shaft portion; a reduction unit attached to the shaft portion; and a housing portion coupled to the shaft portion so as to be rotatable about a rotation axis of an output of the reduction unit, the housing portion being attached to a first bracket portion. The reduction unit includes: an input portion for receiving a rotational driving force from a drive source; and an output portion attached to a second bracket portion, the second bracket portion being integrated with the first bracket portion and spaced apart from and opposed to the first bracket portion in a direction of the rotation axis.

This configuration eliminates the need for two reduction units and has only one reduction unit, thus inhibiting the increase in the size. The brackets can be rotated while reducing the loads such as a radial load and a moment load by using the reduction unit and the housing located coaxially with the rotation axis of the output portion of the reduction unit.

(2) The shaft portion and the housing portion may be movable relative to each other in the direction of the rotation axis.

(3) The housing portion may be shaped like a ring and fitted around the shaft portion. A gap may be formed between an outer circumference of the housing portion and an outer circumference of the shaft portion in the direction of the rotation axis.

(4) A labyrinth seal may be provided between the outer circumference of the housing portion and the outer circumference of the shaft portion.

(5) An opposed surface of at least one of the first bracket portion and the second bracket portion may have an assembly position regulator provided thereon, the assembly position regulator having a predetermined height toward an inside along the rotation axis. A distance of the gap may be larger than the height of the assembly position regulator in the direction of the rotation axis.

(6) A bearing may be provided between the housing portion and the shaft portion. The bearing may be tight-fitted to either one of the housing portion and the shaft portion and loose-fitted to the other.

(7) A diameter of connection positions between the housing portion and the first bracket portion around the rotation axis may be equal to a diameter of connection positions between the reduction unit and the second bracket portion around the rotation axis.

(8) A construction machine according to one aspect of the present disclosure comprises: a shaft portion; a reduction unit attached to the shaft portion; and a housing portion coupled to the shaft portion so as to be rotatable about a rotation axis, the housing portion being attached to a first bracket portion. The reduction unit includes: an input portion for receiving a rotational driving force from a drive source; and an output portion attached to a second bracket portion. The second bracket portion is integrated with the first bracket portion and spaced apart from and opposed to the first bracket portion in a direction of the rotation axis. The output portion is attached to the second bracket portion and configured to rotate about the rotation axis. The shaft portion and the housing portion are movable relative to each other in the direction of the rotation axis. The housing portion is shaped like a ring and fitted around the shaft portion. A gap is formed between an outer circumference of the housing portion and an outer circumference of the shaft portion in the direction of the rotation axis. A labyrinth seal is provided between the outer circumference of the housing portion and the outer circumference of the shaft portion. An opposed surface of at least one of the first bracket portion and the second bracket portion has an assembly position regulator provided thereon, the assembly position regulator having a predetermined height toward an inside along the rotation axis. A distance of the gap is larger than the height of the assembly position regulator in the direction of the rotation axis. A bearing is provided between the housing portion and the shaft portion. The bearing is tight-fitted to either one of the housing portion and the shaft portion and loose-fitted to the other. A diameter of connection positions between the housing portion and the first bracket portion around the rotation axis is equal to a diameter of connection positions between the reduction unit and the second bracket portion around the rotation axis.

This configuration allows the reduction unit and the housing portion to be disposed coaxially with the rotation axis and spaced apart from each other, so as to correspond to the respective bearings, thereby increasing the number of components that evenly resist external loads and inhibiting the increase in the size of the drive transmission device with simple structure. Further, it is possible to reduce imbalance of external loads such as a radial load and a moment load acting on the drive transmission device, thereby extending the service life of the components of the drive transmission device.

(9) A method of assembling the construction machine according to one aspect of the present disclosure comprises: a contraction step of bringing the housing portion and the shaft portion closer to each other in the direction of the rotation axis to contract the gap formed between the housing portion and the shaft portion; an insertion step of inserting, after the contraction step, the shaft portion between the bracket portions from a direction intersecting the rotation axis; an extension step of spacing, after the insertion step, the housing portion and the shaft portion apart from each other in the direction of the rotation axis to extend the gap formed between the housing portion and the shaft portion; an attaching step of attaching the output portion of the reduction unit to the opposed surface of the second bracket portion positioned on an inner side in the direction of the rotation axis; and an attaching step of attaching the housing portion to the opposed surface of the first bracket portion positioned on an inner side in the direction of the rotation axis.

The present disclosure makes it possible to reduce imbalance of loads such as a radial load and a moment load while inhibiting increase in the size.

DESCRIPTION OF THE EMBODIMENTS

First Embodiment

Figure 1:
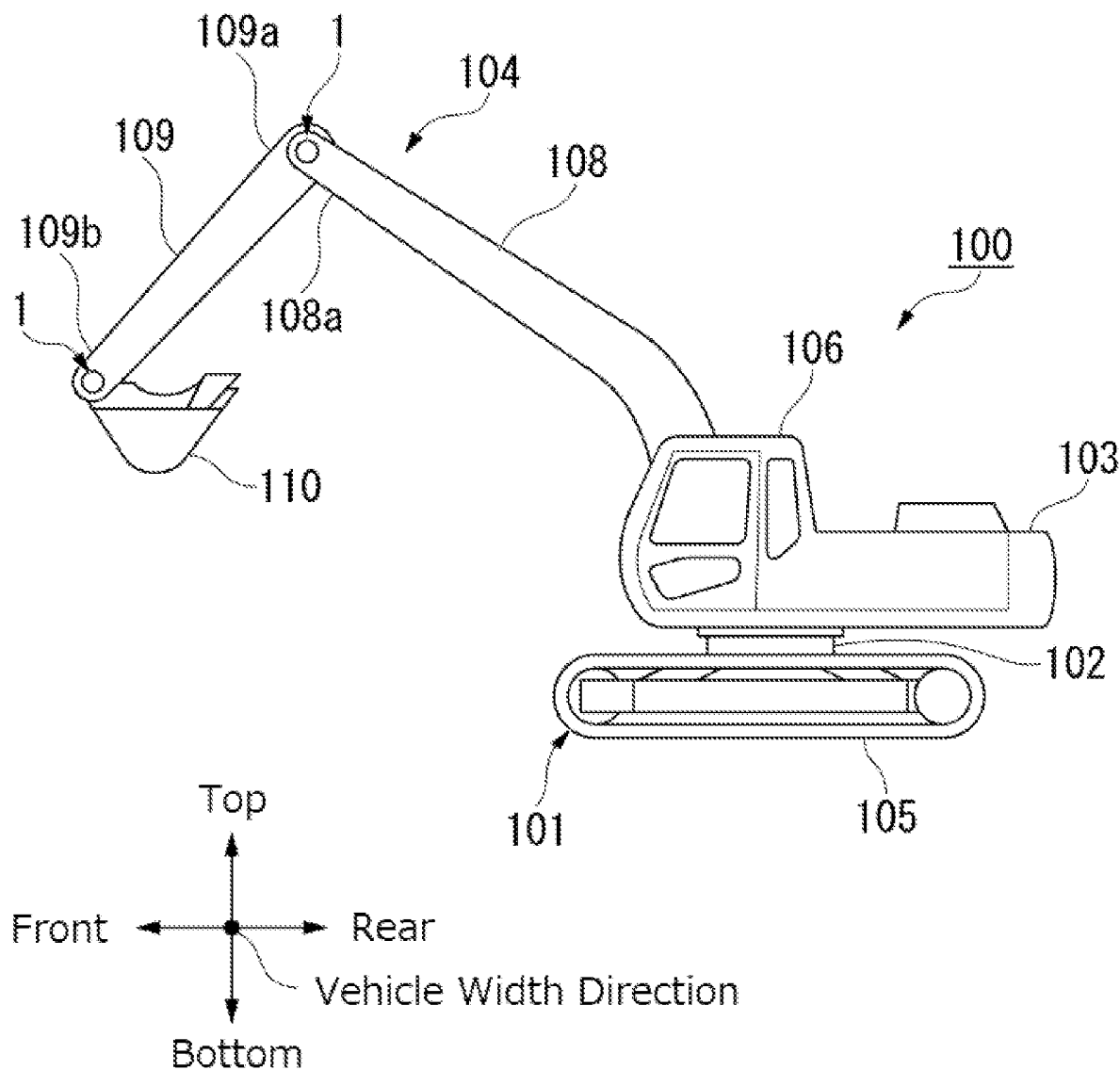
FIG. 1 schematically illustrates an excavator, a construction machine, according to a first embodiment of the present disclosure, viewed from the side.

The following describes a first embodiment of the disclosure with reference to the accompanying drawings.
<Excavator>
FIG. 1 schematically illustrates an excavator 100, which is an embodiment of a construction machine according to one aspect of the disclosure, viewed from the side. In the following description, an operator for operating the excavator 100 is supposed to sit in the driver's cab of the excavator 100 in the state shown in FIG. 1. The direction toward which the operator is facing is herein referred to simply as the front. The opposite side to the front in the horizontal direction is referred to as the rear. The upper and lower directions for the excavator 100 placed on a road surface are simply referred to as the vertical direction. Further, the direction orthogonal to the front-rear direction and the vertical direction is referred to as the vehicle width direction. FIG. 1 shows the excavator 100 as viewed from the vehicle width direction.

As shown in FIG. 1, the excavator 100 (an example of a construction machine) according to the embodiment includes a self-propelled undercarriage 101, a slewable upper structure 103 that is provided on top of the undercarriage 101 via a slewing mechanism 102 and configured to slew relative to the undercarriage 101, and an operating unit 104 provided on the slewable upper structure 103. The undercarriage 101 and the slewing mechanism 102 are driven, for example, by an unshown electric motor with a speed reducer. The undercarriage 101 includes, for example, two continuous tracks 105 arranged side by side in the vehicle width direction. This configuration is not limitative, and it is also possible to use wheels or the like instead of the continuous tracks 105.

A cab 106 is provided in the front side of the slewable upper structure 103. The cab 106 is located near one side in the vehicle width direction. The operator operates the excavator 100 in the cab 106. Further, a support portion (not shown) is provided adjacent to the cab 106 in the front side of the slewable upper structure 103. The support portion is substantially centered in the vehicle width direction. The operating unit 104 is attached to the support portion. The operating unit 104 includes a boom 108 and an arm 109 both extending in the front-rear direction, and a bucket 110 (an example of attachment). The boom 108, the arm 109, and the bucket 110 are rotatably coupled to each other via a drive transmission device 1.

Specifically, one end of the boom 108 in the longitudinal direction is rotatably coupled to the support portion of the slewable upper structure 103 via the drive transmission device 1. FIG. 1, however, does not show the one end of the boom 108 and the drive transmission device 1 provided on that end. The other end 108*a* of the boom 108 in the longitudinal direction is coupled to one end 109*a* of the arm 109 in the longitudinal direction via the drive transmission device 1 such that the arm 109 is rotatable. The bucket 110 is rotatably coupled to the other end 109*b* of the arm 109 via the drive transmission device 1. The bucket 110 is attached to the arm 109 so that it is centered in the vehicle width direction.

The drive transmission devices 1 provided in the coupling portions all have the same configuration. Therefore, in the following description, only the drive transmission device 1 that couples the bucket 110 to the other end 109*b* of the arm 109 will be described, and description of the other drive transmission devices 1 will be hereunder omitted.

Figure 2:
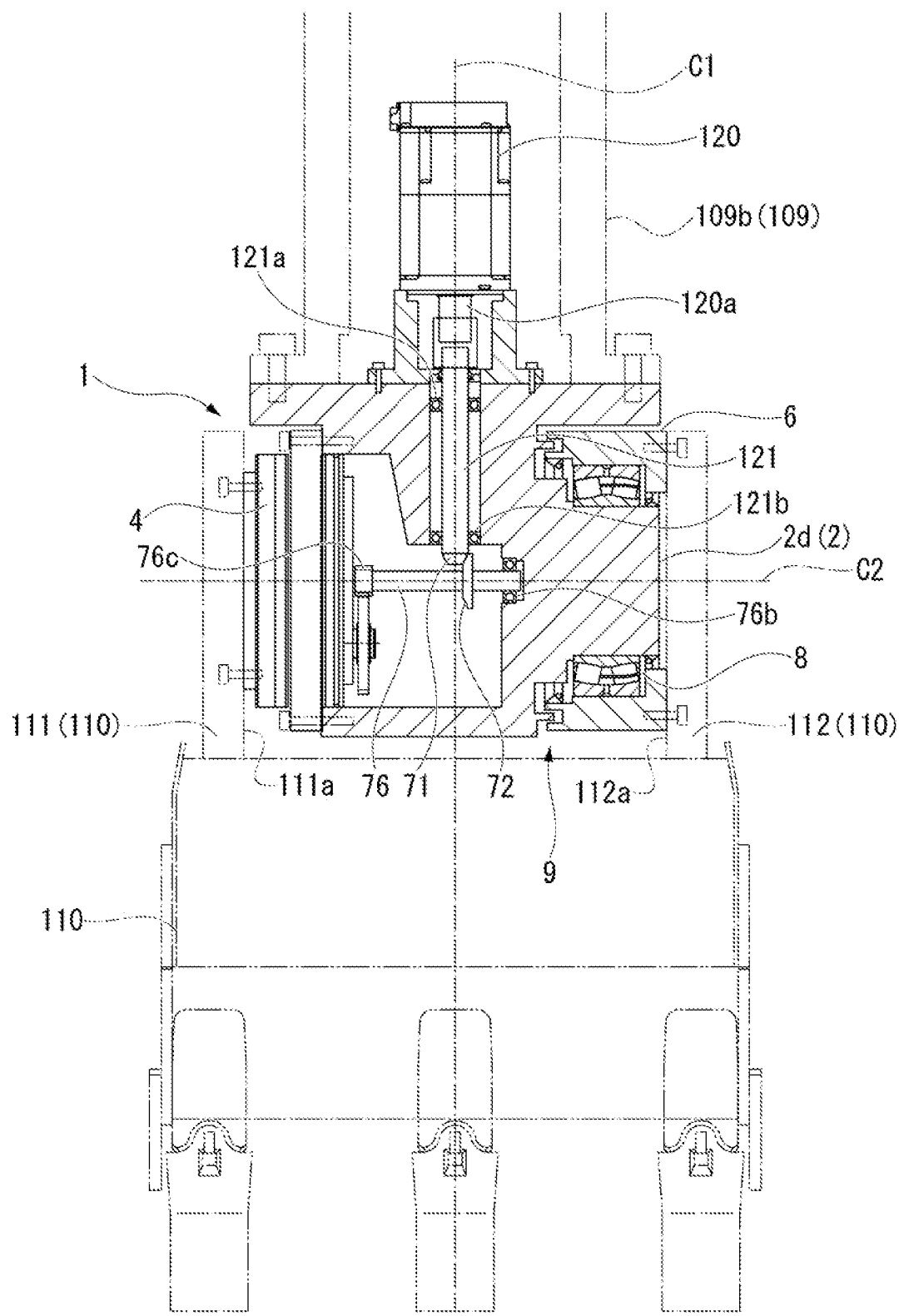
FIG. 2 schematically illustrates a drive transmission device and a coupling portion between an arm and a bucket in a construction machine according to the first embodiment of the disclosure.
Figure 3:
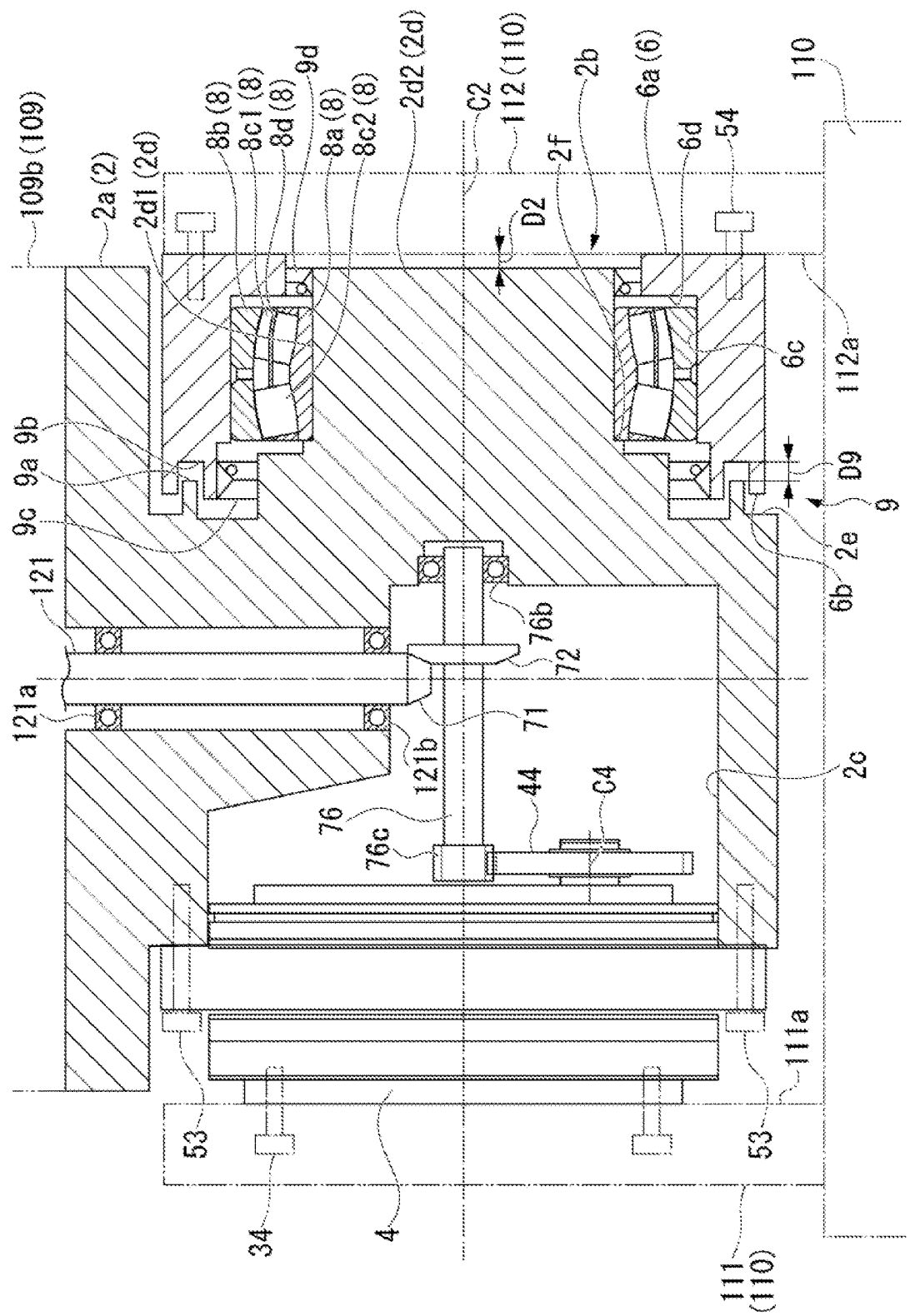
FIG. 3 schematically illustrates the drive transmission device according to the first embodiment of the disclosure.

FIG. 2 schematically illustrates the coupling portion between the arm 109 and the bucket 110. In FIG. 2, the arm 109 and the bucket 110 are shown by a dashed-two dotted line for ease of understanding. FIG. 3 is an enlarged sectional view of the drive transmission device 1. In FIG. 3, the arm 109 and the bucket 110 are shown by a dashed-two dotted line for ease of understanding. As shown in FIG. 2, the arm 109 includes a motor 120 (an example of the drive source or motor in the claims) installed therein. Thus, the rotational force of the motor 120 can be transmitted to the bucket 110 via the drive transmission device 1. The arm 109 is an example of the first member recited in the claims. The bucket 110 is an example of the second member recited in the claims.

The motor 120 is, for example, what is called an electric motor driven by electric power of an external power source (battery) provided in the slewable upper structure 103. The motor 120 may be what is called a brushed motor, a brushless motor, or any other various motors driven by electric power. The motor 120 includes a motor shaft 120*a* rotatable about a first rotation axis C1. The motor shaft 120*a* extends from the motor 120 side toward the bucket 110 side. The first rotation axis C1 and the longitudinal direction of the arm 109 coincide with each other. The motor 120 may be a hydraulic motor. In this case, the hydraulic motor is driven with a hydraulic pressure supplied, for example, from a pressure fluid supply provided in the slewable upper structure 103.

<Drive Transmission Device>

As shown in FIGS. 2 and 3, the drive transmission device 1 is disposed on the second rotation axis C2 (an example of the rotation axis in the claims) of the bucket 110 relative to the arm 109. The drive transmission device 1 is interposed between attachment brackets (bracket portions) 111, 112 of the bucket 110 arranged on the second rotation axis C2. The attachment bracket (second bracket portion) 111 and the attachment bracket (first bracket portion) 112 are spaced apart from and opposed to each other in the direction along the second rotation axis C2. With the attachment bracket 111 and the attachment bracket 112 fixed to the drive transmission device 1, the bucket 110 is rotatable about the second rotation axis C2 relative to the arm 109. The attachment bracket 111 and the attachment bracket 112 are integrally joined to each other via the drive transmission device 1. Thus, the attachment bracket 111 and the attachment bracket 112 are integrated together.

As shown in FIGS. 2 and 3, the drive transmission device 1 includes a shaft portion 2, a reduction unit 4, a housing portion 6, and a bearing 8. The shaft portion 2 is fixed to the other end 109*b* of the arm 109. The shaft portion 2 is interposed between the attachment bracket 111 and the attachment bracket 112 along the second rotation axis C2. The reduction unit 4 is located close to the attachment bracket 111 and coupled to the attachment bracket 111.

The housing portion 6 is located close to the attachment bracket 112 and coupled to the attachment bracket 112. The housing portion 6 is coupled to the shaft portion 2 so as to be rotatable about the second rotation axis C2. Specifically, the housing portion 6 is coupled to the outer circumference of the shaft portion 2 via the bearing 8. In the following description, the direction parallel to the second rotation axis C2 is referred to as an axial direction, and the circumferential direction around the second rotation axis C2 is referred to as a circumferential direction. Further, the direction orthogonal to the axial direction and the circumferential direction may be referred to as a radial direction.

<Shaft Portion>

The shaft portion 2 includes a fixed portion 2*a* and a rotation transmitting portion 2*b*. The fixed portion 2*a* is fixed to the other end 109*b* of the arm 109, and the rotation transmitting portion 2*b* is positioned farther from the arm 109 than the fixed portion 2*a* along the first rotation axis C1. The rotation transmitting portion 2*b* extends along the second rotation axis C2. The rotation transmitting portion 2*b* has a substantially cylindrical outer surface extending at least along the bucket 110 and centered on the second rotation axis C2.

The rotation transmitting portion 2*b* has an internal space 2*c* that is open toward the attachment bracket 111. The reduction unit 4 is attached to the opening portion of the internal space 2*c*. The axis of the opening of the internal space 2*c* coincides with the second rotation axis C2. The opening of the internal space 2*c* is closed by the reduction unit 4 thus attached. The rotation transmitting portion 2*b* has a housing shaft portion 2*d* having a cylindrical shape and disposed close to the attachment bracket 112. The housing shaft portion 2*d* extends along the second rotation axis C2. The axis of the housing shaft portion 2*d* coincides with the second rotation axis C2. The housing portion 6 having a ring-like shape is attached on the outer circumference of the housing shaft portion 2*d*. The structure around the housing shaft portion 2*d* will be described later, along with the housing portion 6.

In this embodiment, the housing shaft portion 2*d* is supposed to be a solid cylindrical shaft. However, this is not limitative. For example, the housing shaft portion 2*d* may have a hollow cylindrical shape with a space inside to house the motor 120. In this case, a transmission shaft 121 (described later) may be replaced with a transmission shaft extending along the second rotation axis C2.

The reduction unit 4 is coupled to the motor shaft 120*a* via the transmission shaft 121. The reduction unit 4 receives the drive rotation from the motor 120 via a first bevel gear 71 and a second bevel gear 72. The first bevel gear 71 is formed on the transmission shaft 121 and configured to rotate about the first rotation axis C1 along with the transmission shaft 121. The first bevel gear 71 is positioned on the opposite side to the motor 120 with respect to the transmission shaft 121. The second bevel gear 72 is meshed with the first bevel gear 71 and configured to rotate about the second rotation axis C2 as the first bevel gear 71 rotates. The first bevel gear 71 and the second bevel gear 72 are located in the internal space 2c of the shaft portion 2.

The transmission shaft 121 extends from the arm 109 side to the inside of the internal space 2c of the shaft portion 2 along the first rotation axis C1. The transmission shaft 121 is rotatably supported by bearings 121a, 121b to the arm 109 and the shaft portion 2. The bearings 121a, 121b may be provided on either one of the arm 109 and the shaft portion 2 or both of them. Further, when a bearing portion is provided between the arm 109 and the shaft portion 2, the bearings 121a, 121b may be provided in the bearing portion. The bearings 121a, 121b may have various bearing structures that can rotatably support the transmission shaft 121 to the arm 109 and the shaft portion 2.

The second bevel gear 72 is formed on a first operation output shaft 76 and configured to rotate about the second rotation axis C2. The first operation output shaft 76 is arranged coaxially with the second rotation axis C2 and configured to rotate about the second rotation axis C2 along with the second bevel gear 72. The first operation output shaft 76 is located in the inside of the shaft portion 2. One end of the first operation output shaft 76 is rotatably supported by a bearing 76b located in the inside of the shaft portion 2. The outer circumferential surface of the other end of the first operation output shaft 76 has a teeth portion 76c meshed with the reduction unit 4.

<Reduction Unit>

Figure 4:
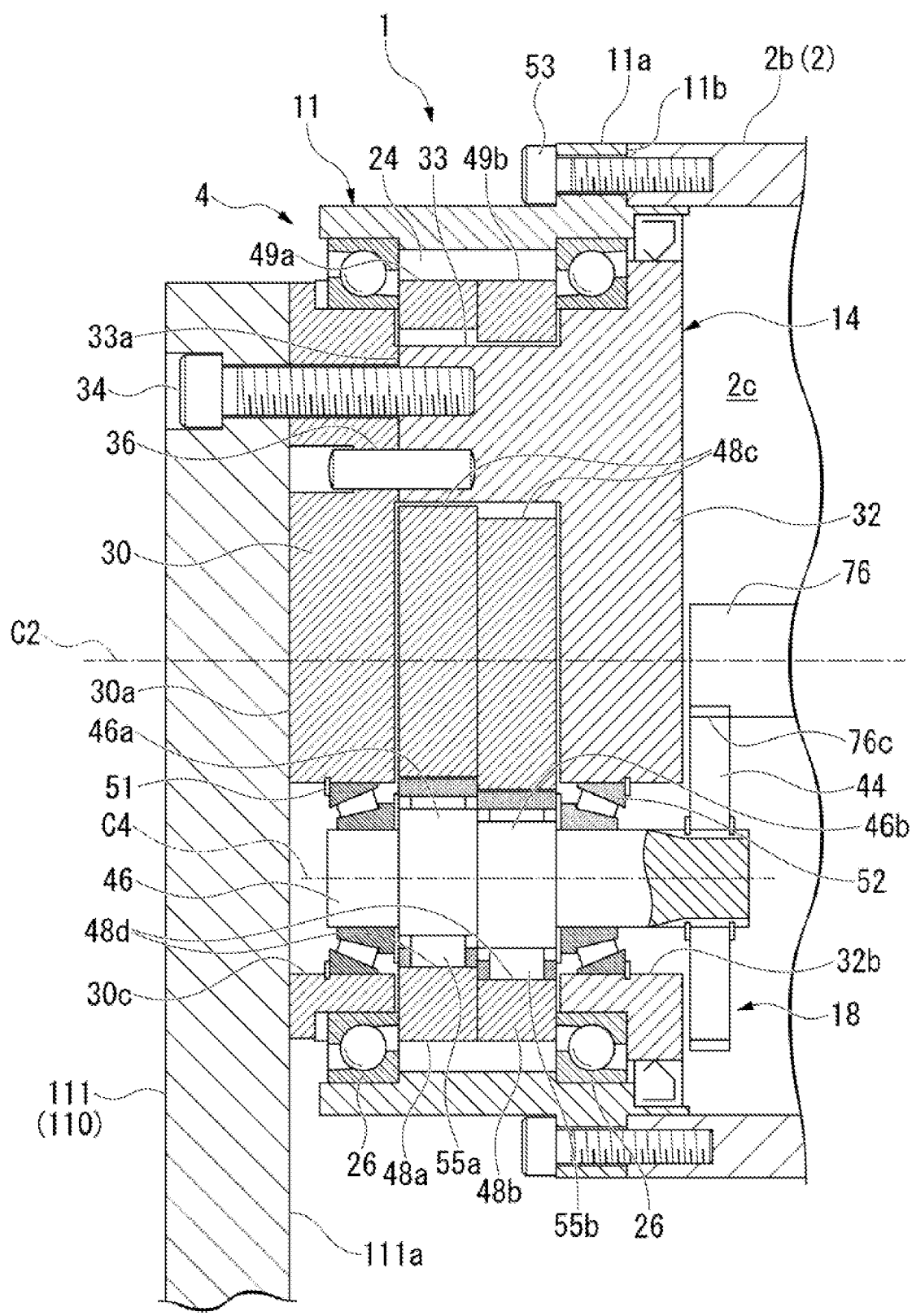
FIG. 4 is a sectional view showing a reduction unit of the drive transmission device according to the first embodiment of the disclosure.

FIG. 4 schematically shows the configuration of the reduction unit 4. As shown in FIG. 4, the reduction unit 4 includes a case (fixed portion) 11 having a cylindrical shape, a carrier (output portion) 14 disposed radially inside the case 11, and a reduction input portion (input portion) 18. The reduction input portion 18 rotates the carrier 14 at a rotation speed reduced at a predetermined ratio with respect to the rotation speed of the first operation output shaft 76. The case 11 is fixed to the shaft portion 2. The entire reduction unit 4 is thus assembled to the shaft portion 2. The reduction unit 4 receives the rotational driving force from the motor 120 input at the reduction input portion 18. The carrier 14 is attached to an opposed surface 111a of the attachment bracket 111 that is opposed to the carrier 14 in the direction of the second rotation axis C2. The entire reduction unit 4 is thus assembled to the attachment bracket 111.

<Case>

An outer flange portion 11a projecting outward in the radial direction is integrally formed with the outer circumferential surface of the case 11. The outer flange portion 11a has a rectangular section along the axial direction. The rotation transmitting portion 2b is disposed on the end surface 11b of the outer flange portion 11a facing toward the shaft portion 2 (the right side in FIG. 4). The outer flange portion 11a is fastened and fixed to the rotation transmitting portion 2b by bolts 53. Internal teeth 24 are provided on an inner circumferential surface of the case 11. The internal teeth 24 are pin-shaped (cylindrical) teeth provided on the inner circumferential surface of the case 11. Two or more internal teeth 24 are arranged at equal intervals in the circumferential direction.

<Carrier>

The carrier 14 is rotatably supported to the case 11 by a pair of main bearings 26 disposed at a distance from each other in the axial direction. The main bearings 26 are, for example, angular contact ball bearings. The carrier 14 is positioned coaxially with the case 11 and the second rotation axis C2.

The carrier 14 includes a base plate portion 32 disposed in the internal space 2c of the shaft portion 2, an end plate portion 30 disposed on the opposite side to the internal space 2c with respect to the base plate portion 32, and three pillar portions 33 with a columnar shape that are integrally molded with the base plate portion 32. The pillar portions 33 protrude out from the base plate portion 32 toward the end plate portion 30 and are equally spaced in the circumferential direction. The end plate portion 30 is disposed on the distal end 33a of the pillar portions 33. The attachment bracket 111 of the bucket 110 is arranged on one surface 30a of the end plate portion 30 facing away from the base plate portion 32. The end plate portion 30 and the attachment bracket 111 are both fastened and fixed to the pillar portions 33 by bolts 34. A space having a predetermined width in the axial direction is formed between the base plate portion 32 and the end plate portion 30.

A pin 36 for positioning the end plate portion 30 with respect to the base plate portion 32 is provided radially inside the bolt 34 fixed in the pillar portion 33. The pin 36 is disposed such that it spans the pillar portion 33 and the end plate portion 30. The pillar portion 33 is not necessarily formed integrally with the base plate portion 32. In such a case, for example, the pillar portion 33 may be assembled to the base plate portion 32 by fastening or other means. Further, the configuration of the pillar portions 33 is not limited to such a columnar shape. The pillar portions 33 may be formed in any shape or configuration provided that they form a space having a certain width in the axial direction between the base plate portion 32 and the end plate portion 30.

The end plate portion 30 and the base plate portion 32 have a plurality (for example, three in this embodiment) of through holes 30c and 32b, respectively, into which crankshafts 46 (described later) are inserted. The through holes 30c, 32b are arranged at equal intervals in the circumferential direction.

<Reduction Input Portion>

The reduction input portion 18 includes two or more (for example, three in this embodiment) transmission gears 44 that mesh with the teeth portion 76c of the first operation output shaft 76, two or more (for example, three in this embodiment) crankshafts 46 each having one end fixed to associated one of the transmission gears 44, a first external gear (an example of an external teeth member) 48a and a second external gear 48b that rotate oscillatorily with the rotation of the crankshafts 46.

Since the transmission gears 44 are fixed to one end of the crankshafts 46, the rotation of the first operation output shaft 76 is transmitted to the crankshafts 46 via the transmission gears 44. Each of the crankshafts 46 rotates about a crank rotation axis C4 parallel to the second rotation axis C2. The crankshaft 46 is rotatably supported to the end plate portion 30 via a first crank bearing 51. The crankshaft 46 is also rotatably supported to the base plate portion 32 via a second crank bearing 52. The first crank bearing 51 and the second crank bearing 52 are, for example, tapered roller bearings.

At the center of the crankshaft 46 in the axial direction, there are provided a first eccentric portion 46a and a second eccentric portion 46b disposed eccentrically from the axis of the crankshaft 46. The first and second eccentric portions 46a, 46b are disposed adjacent to each other in the axial direction between the first crank bearing 51 and the second crank bearing 52. The first eccentric portion 46a is disposed adjacent to the first crank bearing 51. The second eccentric portion 46b is disposed adjacent to the second crank bearing 52. Further, the first eccentric portion 46a and the second eccentric portion 46b are out of phase with each other. The crankshaft 46 thus configured is inserted into the through holes 30c and 32b in the end plate portion 30 and the base plate portion 32, respectively. Thus, the crankshafts 46 are arranged at equal intervals in the circumferential direction like the through holes 30c and 32b.

A first roller bearing 55a is attached to the first eccentric portion 46a of the crankshaft 46. A second roller bearing 55b is attached to the second eccentric portion 46b. The first roller bearing 55a is, for example, a cylindrical roller bearing. The first roller bearing 55a includes a plurality of rollers and a cage for holding the plurality of rollers. The second roller bearing 55b has the same configuration as the first roller bearing 55a. The first external gear 48a and the second external gear 48b are oscillatorily rotated in conjunction with the rotation of the crankshafts 46 via the roller bearings 55a and 55b.

The first and second external gears 48a, 48b are disposed in a space between the base plate portion 32 and the end plate portion 30 of the carrier 14. The first external gear 48a and the second external gear 48b have external teeth 49a and 49b, respectively, that mesh with the internal teeth 24 of the casing 11. In the first external gear 48a and the second external gear 48b, there are formed first through holes 48c into which the pillar portions 33 are inserted, and second through holes 48d into which the eccentric portions 46a and 46b of the crankshafts 46 are inserted.

The first eccentric portion 46a of the crankshaft 46 and the first roller bearing 55a are inserted into the second through hole 48d of the first external gear 48a. The second eccentric portion 46b of the crankshaft 46 and the second roller bearing 55b are inserted into the second through hole 48d of the second external gear 48b. Thus, as the first eccentric portion 46a and the second eccentric portion 46b are oscillatorily rotated by the rotation of the crankshaft 46, the first external gear 48a and the second external gear 48b are oscillatorily rotated while they mesh with the internal teeth 24 of the case 11.

<Housing Portion>

As shown in FIG. 3, the housing portion 6 is shaped like a ring and is capable of rotating about the second rotation axis C2 along the outer circumferential surface 2d1 of the housing shaft portion 2d. The housing portion 6 can slide, glide, or move relative to the outer circumferential surface 2d1 of the housing shaft portion 2d in the direction along the second rotation axis C2. The housing portion 6 has an end portion 6a in contact with an opposed surface 112a of the attachment bracket 112 facing toward the housing portion 6. The end portion 6a is attached to the opposed surface 112a via bolts 54. Thus, the housing portion 6 is integrally assembled to the attachment bracket 112. The end portion (end surface) 6a and the opposed surface 112a are in contact with each other over the entire circumference, making it possible to prevent foreign matter from entering from the outside.

The end surface 2d2 of the housing shaft portion 2d is opposed to the opposed surface 112a and is spaced from the opposed surface 112a in the direction of the second rotation axis C2. Therefore, when the housing portion 6 is rotated together with the attachment bracket 112 about the second rotation axis C2, the end surface 2d2 and the opposed surface 112a remain spaced apart from each other. An end surface 6b of the housing portion 6 that faces toward the attachment bracket 111 is opposed to a stepped surface 2e.

The stepped surface 2e is formed on the shaft portion 2 such that it encircles the housing shaft portion 2d over the entire circumference. A gap is formed between the end surface 6b and the stepped surface 2e. A labyrinth seal 9 is provided in this gap.

<Labyrinth Seal>

The labyrinth seal 9 is formed in conformity to the gap between the end surface 6b and the stepped surface 2e, and the labyrinth seal 9 extends over the entire circumference of the shaft portion 2 around the second rotation axis C2.

Specifically, the labyrinth seal 9 includes a projection 9a formed on the stepped surface 2e and a concave groove 9b formed in the end surface 6b. The projection 9a projects from the stepped surface 2e toward the housing portion 6, and the projection 9a extends over the entire circumference around the second rotation axis C2. The concave groove 9b is formed in a concave shape in the end surface 6b and conforms to the projection 9a. It is also possible to form the labyrinth seal 9 with the projection 9a formed on the end surface 6b and the concave groove 9b formed in the stepped surface 2e. Further, the distance D9 of the gap between the projection 9a and the concave groove 9b along the second rotation axis C2 is larger than the distance D2 between the opposed surface 112a and the end surface 2d2 along the second rotation axis C2.

A tight seal 9c is provided at a position closer to the second rotation axis C2 than is the labyrinth seal 9. The tight seal 9c is provided between the housing portion 6 and the housing shaft portion 2d and extends over the entire circumference. In addition, a tight seal 9d is provided at a position closer to the second rotation axis C2 than is the end portion 6a. The tight seal 9d is provided between the housing portion 6 and the housing shaft portion 2d and extends over the entire circumference. The labyrinth seal 9 may be formed of multiple sets of projections and concave grooves. In this case, the multiple sets of projections and concave grooves are arranged in the radial direction. In other words, the multiple sets of projections and concave grooves can be concentrically arranged around the second rotation axis C2.

<Bearing>

The bearing 8 is a self-aligning bearing and includes an inner race 8a, an outer race 8b, cylindrical rollers 8c1, cylindrical rollers 8c2, and a cage 8d. The inner race 8a is fixed to the outer circumferential surface 2d1 of the housing shaft portion 2d. The outer race 8b is located on a radially outer side of the inner race 8a and is fixed to the inner circumferential surface 6c of the housing portion 6. The cylindrical rollers 8c1 and the cylindrical rollers 8c2 are located between the inner race 8a and the outer race 8b and arranged at regular intervals in the circumferential direction around the second rotation axis C2. Further, the cylindrical rollers 8c1 and the cylindrical rollers 8c2 are arranged in parallel in the direction along the second rotation axis C2. The cage 8d has an annular shape centered on the second rotation axis C2 and disposed between the inner race 8a and the outer race 8b. The cage 8d holds the cylindrical rollers 8c1 such that they are spaced apart from each other around the second rotation axis C2 and they can revolve around the second rotation axis C2. Likewise, the cage 8d holds the cylindrical rollers 8c2 such that they are spaced apart from each other around the second rotation axis C2 and they can revolve around the second rotation axis C2.

The cylindrical rollers 8c1 and the cylindrical rollers 8c2 are supported between the inner race 8a and the outer race 8b such that the side on which the axis of the cylindrical rollers 8c1 and the axis of the cylindrical rollers 8c2 are close to each other is at a larger distance from the second rotation axis C2 than the side on which these axes are far from each other. The outer circumferential surface of each cylindrical roller 8c1 is bulged so that its diameter is larger at the middle in the axial direction. Likewise, the outer circumferential surface of each cylindrical roller 8c2 is bulged so that its diameter is larger at the middle in the axial direction. The opposed surfaces of the inner race 8a and the outer race 8b are curved to conform to the outer circumferential surface of the cylindrical rollers 8c1 and the cylindrical rollers 8c2.

The inner circumferential surface of the inner race 8a is fixed to the outer circumferential surface 2d1 of the housing shaft portion 2d by a tight fit, for example. The end portion of the inner race 8a that is located on the attachment bracket 111 side is in contact with a step 2f formed on the shaft portion 2. The end portion of the inner race 8a that is located on the attachment bracket 112 side is spaced apart from an inner end surface 6d of the housing portion 6.

The outer circumferential surface of the outer race 8b is fixed to the inner circumferential surface 6c of the housing portion 6 by a loose fit, for example. The end portion of the outer race 8b that is located on the attachment bracket 112 side is spaced apart from the inner end surface 6d of the housing portion 6. Accordingly, the end portion of the bearing 8 that is located on the attachment bracket 112 side is spaced apart from the inner end surface 6d of the housing portion 6.

<Operation of Drive Transmission Device>

Next, a description is given of an operation of the drive transmission device 1. When the motor 120 provided in the arm 109 shown in FIG. 2 is driven, the rotation of the motor shaft 120a is transmitted to the first bevel gear 71 in the drive transmission device 1 via the transmission shaft 121. Thus, the second bevel gear 72 that meshes with the first bevel gear 71 is rotated. Further, the rotation of the second bevel gear 72 is transmitted to the reduction unit 4 via the first operation output shaft 76.

When the rotation of the first operation output shaft 76 causes the rotation of the transmission gears 44 that mesh with the teeth portion 76c, the crankshafts 46 rotate together with the transmission gears 44 about the respective crank rotation axes C4. When the crankshafts 46 rotate, the first eccentric portions 46a and the second eccentric portions 46b rotate oscillatorily. The oscillation of the first eccentric portions 46a causes the first external gear 48a to rotate while meshing with the internal teeth 24. Likewise, the oscillation of the second eccentric portions 46b causes the second external gear 48b to rotate while meshing with the internal teeth 24. Thus, the crankshafts 46 rotate about the respective crank rotation axes C4 and revolve around the second rotation axis C2.

In this embodiment, each of the pillar portions 33 penetrating the first through hole 48c formed in the external gears 48a, 48b is fixed to the base plate portion 32. Therefore, the carrier 14 is rotated about the second rotation axis C2 relative to the case 11 at a rotation speed lower than that of the first operation output shaft 76. The other end 109b of the arm 109 is fixed to the case 11 via the shaft portion 2. The attachment bracket 111 of the bucket 110 is fixed to the end plate portion 30 of the carrier 14.

Further, the housing portion 6 can rotate coaxially with the carrier 14 relative to the shaft portion 2 fixed to the case 11. The attachment bracket 112 of the bucket 110 is fixed to the housing portion 6. Therefore, the carrier 14 and the housing portion 6 rotate together with the bucket 110 about the second rotation axis C2. Thus, driving the motor 120 provided in the arm 109 can cause the bucket 110 to rotate about the second rotation axis C2 relative to the arm 109.

The first operation output shaft 76 of the reduction unit 4 serves as an input shaft for inputting the rotation of the motor shaft 120a to the reduction input portion 18. The carrier 14 serves as an output shaft for decelerating the rotation of the first operation output shaft 76 and outputting the decelerated rotation to the bucket 110. Further, the carrier 14 of the reduction unit 4 and the housing portion 6 disposed coaxially with the carrier 14 are arranged in the direction along the second rotation axis C2 so as to be substantially symmetrical with respect to the first rotation axis C1. In other words, the reduction unit 4 and the housing portion 6 are disposed coaxially with the second rotation axis C2 and spaced apart from each other, so as to correspond to the respective bearings.

The bucket 110 has attachment surfaces 111a, 112a internally contacting with and bolted to the end plate portion 30 of the reduction unit 4 and the end portion 6a of the housing portion 6, respectively. This makes a double support structure in which the weight of and external forces on the bucket 110 are supported at two locations. Therefore, unlike a single support structure, the external load can be supported evenly, and the increase in the size of the drive transmission device 1 can be inhibited with a simple structure. Further, it is possible to reduce imbalance of external loads such as a radial load and a moment load acting on the drive transmission device 1, thereby extending the service life of the components of the drive transmission device 1.

The following describes a method of assembling a construction machine including the drive transmission device 1 according to the embodiment. The following description will be focused on the assembling process related to the drive transmission device 1. FIGS. 5 to 8 are process diagrams showing a method of assembling the drive transmission device 1 according to the embodiment.

<Assembling Method>

Figure 5:
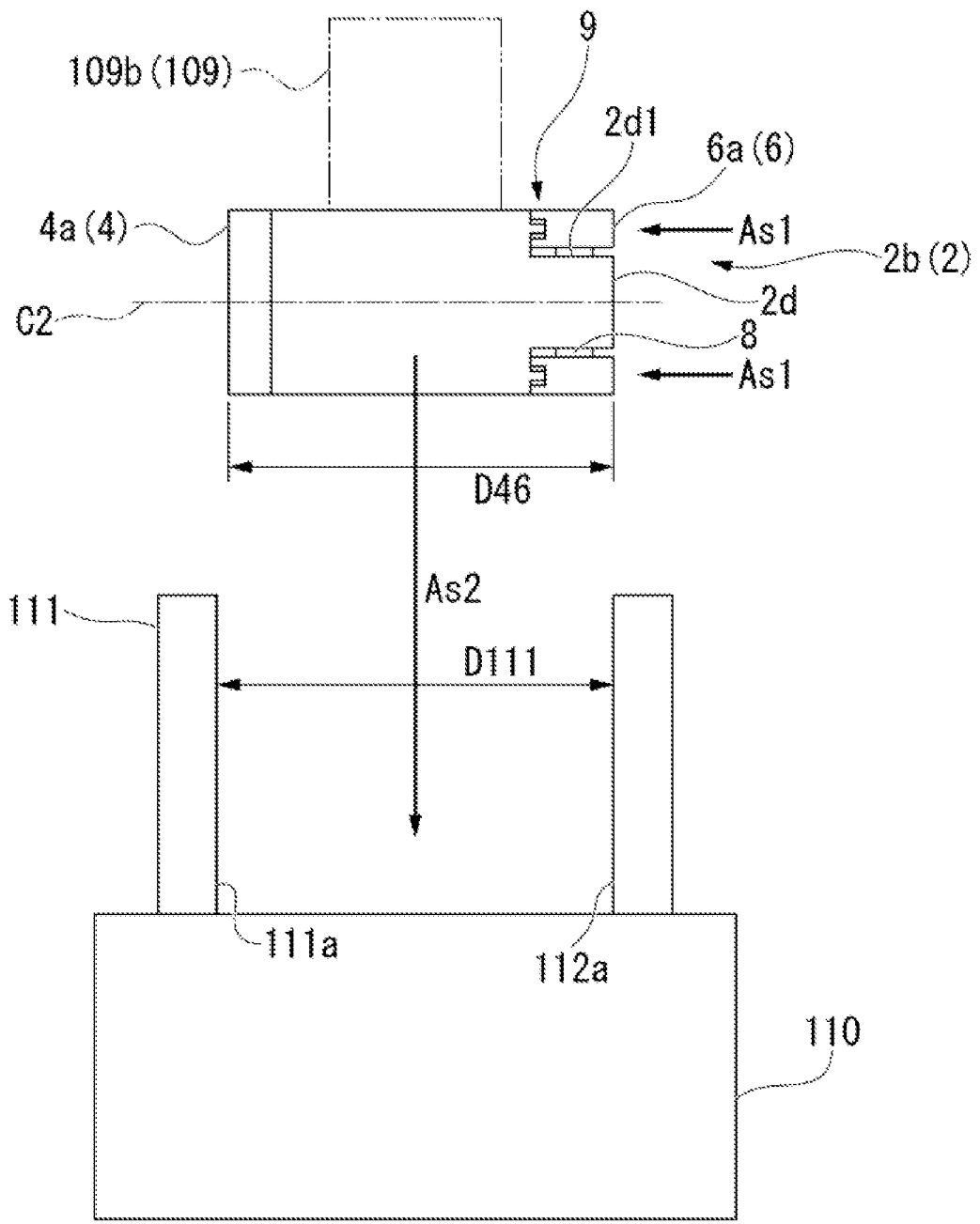
FIG. 5 schematically illustrates dimensions and an assembling process of the drive transmission device according to the first embodiment of the disclosure.

The method of assembling the drive transmission device 1 according to the embodiment includes a preparation step, a contraction step, an insertion step, a reduction unit attaching step (attaching step), an extension step, and a housing portion attaching step (attaching step). The first step in assembling the drive transmission device 1, or the preparation step, is to insert the reduction unit 4 into the internal space 2c (see FIG. 4) of the shaft portion 2 to close the opening, as shown in FIG. 5. At this time, the reduction unit 4 and the shaft portion 2 are fixed to each other with the bolts 53. Simultaneously, the housing portion 6 is assembled to the housing shaft portion 2d via the bearing 8. The housing portion 6 can move relative to the housing shaft portion 2d in the direction of the second rotation axis C2.

Next, in the contraction step, as shown by the arrows As1 in FIG. 5, the housing portion 6 and the shaft portion 2 are brought closer to each other in the direction along the second rotation axis C2. In other words, the housing portion 6 is slid relative to the outer circumferential surface 2d1 of the housing shaft portion 2d to move the housing portion 6 toward the reduction unit 4. The gap between the end surface 6b and the stepped surface 2e, which form the labyrinth seal 9, is then contracted (see FIG. 3). Thus, as shown in FIG. 5, the dimension D46 from the end surface 4a of the reduction unit 4 to the end portion 6a of the housing portion 6 in the direction of the second rotation axis C2 is reduced as compared to the assembled state shown in FIG. 3. As shown in FIG. 5, the dimension D46 is smaller than the distance D111 between the opposed surface 111a of the attachment bracket 111 and the opposed surface 112a of the attachment bracket 112 in the direction of the second rotation axis C2.

Next, in the insertion step following the completion of the contraction step, as shown by the arrow As2 in FIG. 5, the shaft portion 2 is inserted between the opposed surface 111a of the attachment bracket 111 and the opposed surface 112a of the attachment bracket 112 from the direction intersecting the second rotation axis C2. As described above, the reduction unit 4, the housing portion 6, and the bearing 8 are assembled to the shaft portion 2. Since the dimension D46 is smaller than the distance D111, the insertion step can be performed easily.

Figure 6:
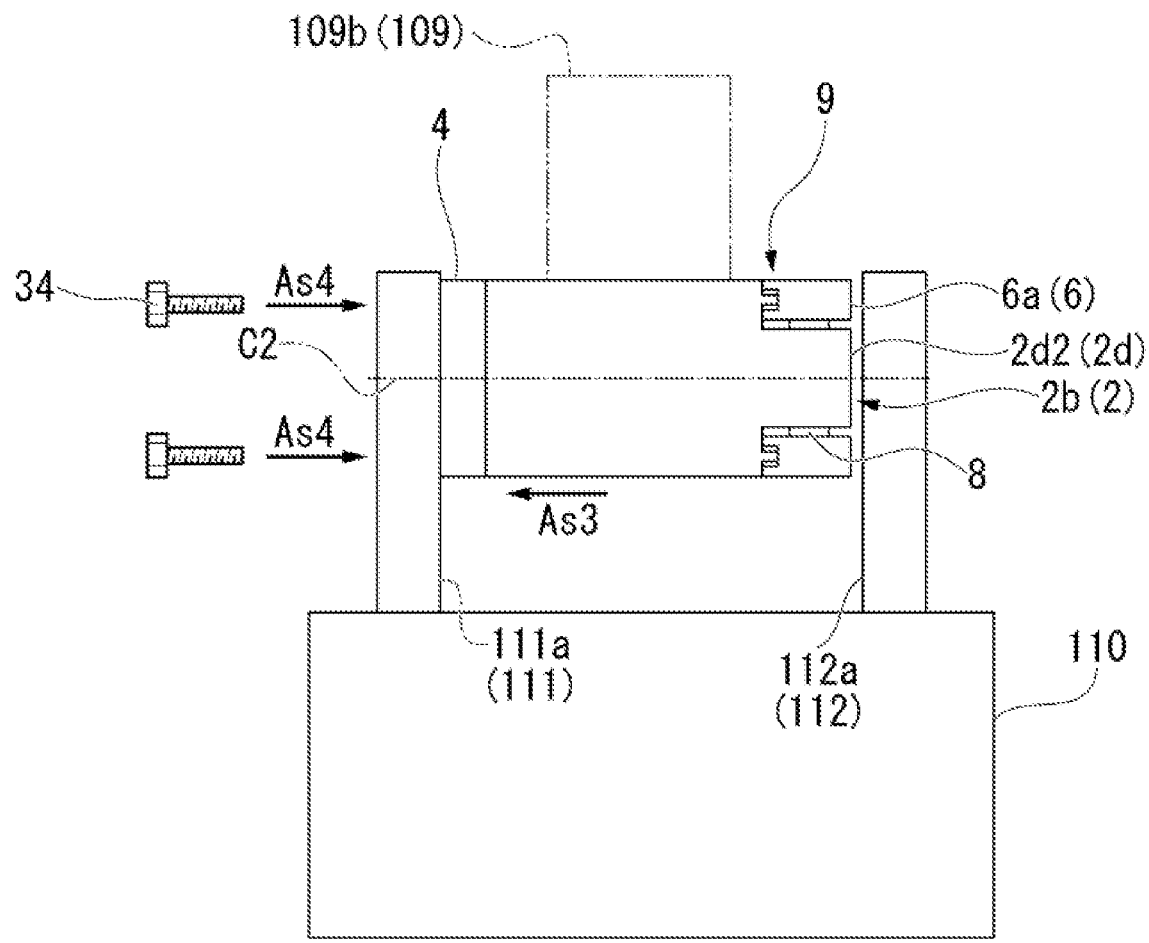
FIG. 6 schematically illustrates an assembling process of the drive transmission device according to the first embodiment of the disclosure.

Next, in the reduction unit attaching step (attaching step), as shown by the arrow As3 in FIG. 6, the shaft portion 2 having the reduction unit 4, the housing portion 6, and the bearing 8 assembled thereto is brought close to the attachment bracket 111 along the second rotation axis C2. Thus, the end surface 4a of the reduction unit 4 can be contacted with the opposed surface 111a. In this state, as shown by the arrows As4 in FIG. 6, the attachment bracket 111 is fastened and fixed to the reduction unit 4 with the bolts 34 (see FIG. 4). Specifically, the end plate portion 30 and the attachment bracket 111 are fastened and fixed to the pillar portions 33 of the carrier 14 with the bolts 34 (see FIG. 4). At this time, the gap between the end surface 6b and the stepped surface 2e, which form the labyrinth seal 9, remains in the contracted state.

Figure 7:
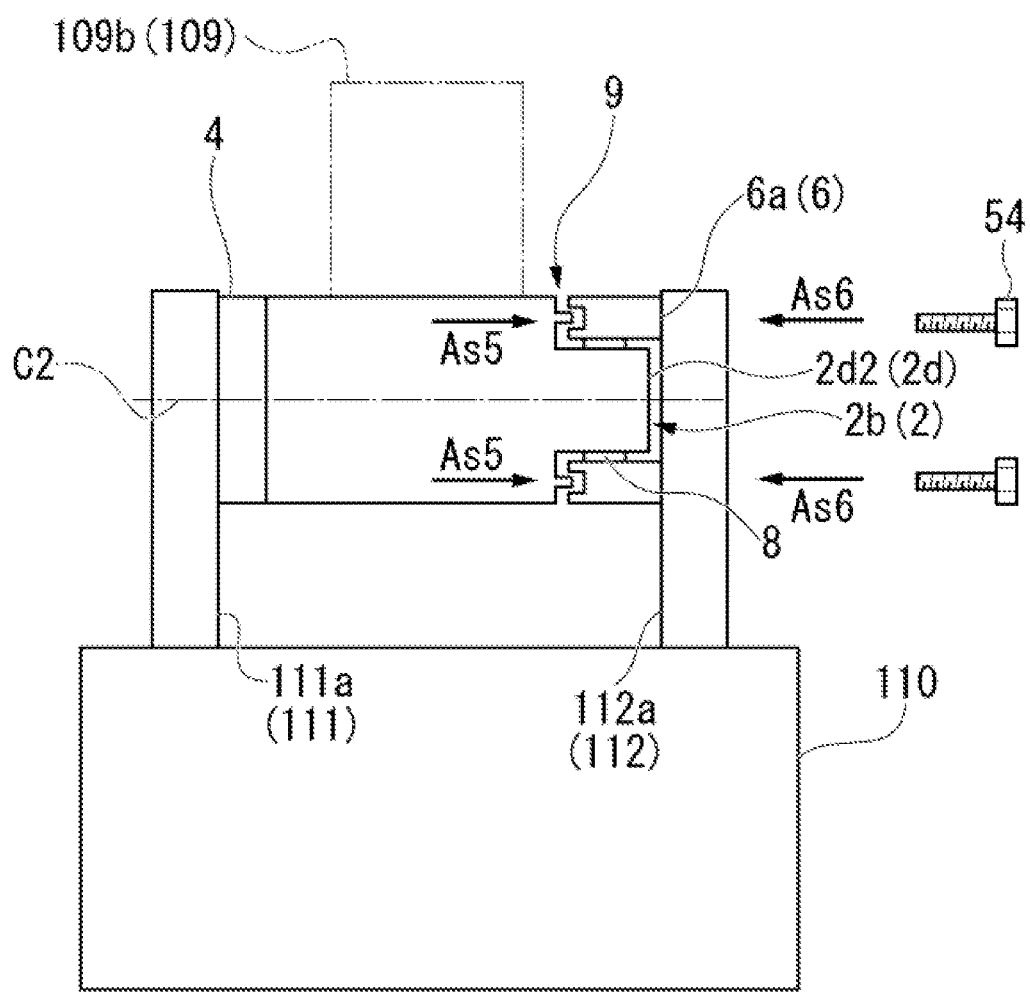
FIG. 7 schematically illustrates an assembling process of the drive transmission device according to the first embodiment of the disclosure.

Next, in the extension step following the insertion step, as shown by the arrows As5 in FIG. 7, the housing portion 6 and the shaft portion 2 are spaced apart from each other in the direction along the second rotation axis C2 to extend the gap formed between the housing portion 6 and the shaft portion 2. At this time, the attachment bracket 112 and the housing portion 6 are brought closer until they contact with each other. Thus, the opposed surface 112a and the end portion 6a contact with each other. Accordingly, the gap between the end surface 6b and the stepped surface 2e is extended to form the labyrinth seal 9.

Next, in the housing portion attaching step (attaching step) following the extension step, as shown by the arrows As6 in FIG. 7, the attachment bracket 112 is fastened and fixed to the housing portion 6 with the bolts 54 (see FIG. 3), with the end surface 6a of the housing portion 6 being in contact with the opposed surface 112a. Thus, the assembling of the drive transmission device 1 is completed.

In the embodiment, the housing portion 6 assembled to the housing shaft portion 2d can move in the direction along the second rotation axis C2. Therefore, the movement of the housing portion 6 in the direction of the second rotation axis C2 enables adjustment of the gaps in the direction of the second rotation axis C2 that are produced on the opposed surface 111a and the opposed surface 112a, both being attachment surfaces for attaching the bucket 110. Thus, in the drive transmission device 1 having the bearing 8 interposed between the shaft portion 2 and the housing portion 6, the movement of the housing portion 6 relative to the shaft portion 2 eliminates the need of adjustment of the gaps.

Further, in the embodiment, it is possible to simultaneously overcome the first and second issues of the conventional art. The first issue is that the gaps in the direction of the rotation axis need to be adjusted in assembling the bucket or the like to the construction machine. The second issue is that sealing is needed to prevent the bearing outside the shaft from being exposed to soil and sand, depending on the service environment.

Further, the shaft portion 2 and the housing portion 6 are provided with the projection 9a on the stepped surface 2e and the concave groove 9b in the end surface 6b, respectively. The distance between the projection 9a and the concave groove 9b can be adjusted appropriately by the movement of the housing portion 6 in the axial direction in attaching the bucket 110, while the distal end of the projection 9a remains positioned in the concave groove 9b. Thus, the sealing performance as the labyrinth seal 9 can be ensured. Therefore, even if there is a risk that the bearing 8 built in to the inner circumference of the housing portion 6 is exposed to, for example, soil and sand during excavation, the labyrinth seal 9 can seal the bearing 8.

In this embodiment, the outer diameter of the housing portion 6 can be approximately equal to the outer diameter of the reduction unit 4, i.e., the outer diameter of the outer flange portion 11a. In this case, in the radial direction with respect to the second rotation axis C2, the diameter of the securing positions (connection positions) of the bolts 53 can be approximately equal to the diameter of the securing positions (connection positions) of the bolts 54. This makes it possible to reduce imbalance of external loads such as a radial load and a moment load acting on the drive transmission device 1 with respect to the second rotation axis C2, thereby extending the service life of the components of the drive transmission device 1.

Further, in this embodiment, the outer diameter of the bearing 8 can be approximately equal to the outer diameter of the carrier 14. This makes it possible to reduce imbalance of external loads such as a radial load and a moment load acting on the drive transmission device 1 with respect to the second rotation axis C2, thereby extending the service life of the components of the drive transmission device 1.

Further, in this embodiment, the distance from the first rotation axis C1 to the bearing 8 along the second rotation axis C2 can be approximately equal to the distance from the first rotation axis C1 to the reduction unit 4 along the second rotation axis C2 (i.e., the distance from the first rotation axis C1 to the middle of the pair of main bearings 26 along the second rotation axis C2). This makes it possible to reduce imbalance of external loads such as a radial load and a moment load acting on the drive transmission device 1 with respect to the second rotation axis C2, thereby extending the service life of the components of the drive transmission device 1.

Further, in this embodiment, the distance between the projection 9a on the stepped surface 2e and the concave groove 9b in the end surface 6b along the radial direction can be set to about several millimeters (e.g., about 0.5 mm to 1.5 mm) to ensure sufficient sealing performance.

In the assembling process of this embodiment, the insertion step may be followed by the housing portion attaching step (attaching step), the extension step, and the reduction unit attaching step (attaching step) performed in this order.

Second Embodiment

Figure 8:
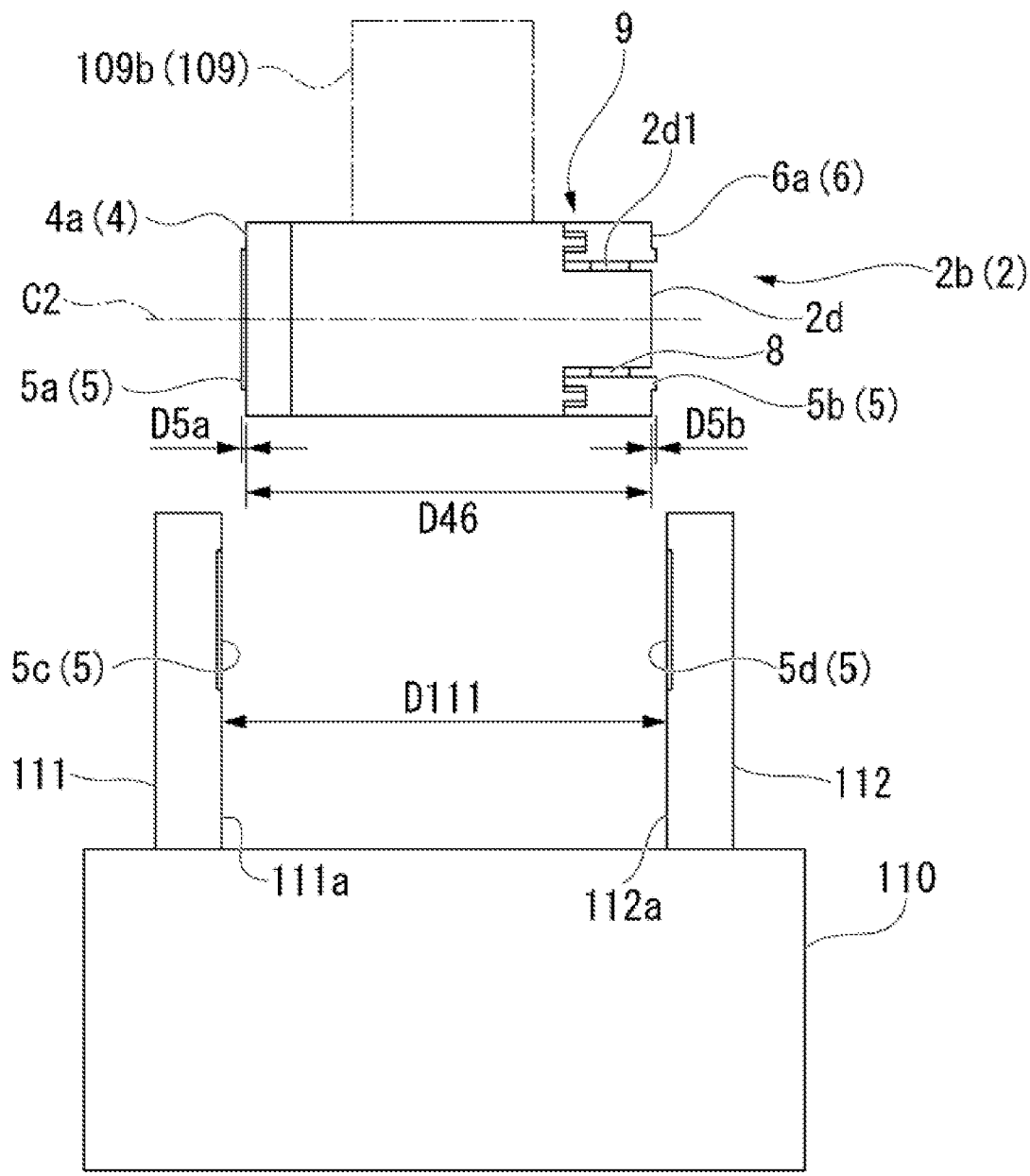
FIG. 8 schematically illustrates dimensions and an assembling process of a drive transmission device according to a second embodiment of the disclosure.

The following describes a drive transmission device relating to a second embodiment of the disclosure with reference to the accompanying drawings. FIG. 8 schematically illustrates dimensions and assembling process of the drive transmission device in the second embodiment of the disclosure. The second embodiment is different from the first embodiment in terms of a position regulator 5. The constituents other than the position regulator 5, which correspond to those in the first embodiment, are denoted by the same reference numerals and are not described here.

As shown in FIG. 8, in the drive transmission device 1 of this embodiment, a position regulator 5 is formed in the opposed surface 111a opposed to the end surface 4a of the reduction unit 4 in the direction of the second rotation axis C2 and in the opposed surface 112a opposed to the end surface 6a of the housing portion 6. The position regulator 5 includes a projection 5a, a projection 5b, a recess 5c, and a recess 5d. The projection 5a is formed on the end surface 4a of the reduction unit 4. The recess 5c is formed in the opposed surface 111a. The projection 5b is formed on the end face 6a of the housing portion 6. The recess 5d is formed in the opposed surface 112a.

Both the projections 5a, 5b extend over the entire circumference around the second rotation axis C2 and have a circular outer shape as viewed from the direction along the second rotation axis C2. Each of the projections 5a, 5b may be either continuous or discontinuous and may have a divided circular shape such as a semicircle.

In the reduction unit attaching step (attaching step), the projection 5a and the recess 5c are aligned with each other, and the projection 5a is fitted into the recess 5c. This accomplishes position restriction between the end surface 4a of the reduction unit 4 and the opposed surface 111a. Likewise, in the housing portion attaching step (attaching step), the projection 5b and the recess 5d are aligned with each other, and the projection 5b is fitted into the recess 5d. This accomplishes position restriction between the housing portion 6 and the opposed surface 112a.

In the direction along the second rotation axis C2, the sum of the height D5a of the projection 5a and the height D5b of the projection 5b is smaller than the difference between the dimension D46 in the contraction step and the distance D111. Further, the difference between the sum of the height D5a, the height D5b, and the dimension D46 in the contraction step and the distance D111 is smaller than the distance D9 of the gap in the labyrinth seal 9 (see FIG. 3).

According to the embodiment, the position regulator 5 facilitates positioning. Further, the movement of the housing portion 6 in the direction of the second rotation axis C2 by bolt fastening enables adjustment of the gaps in the direction of the second rotation axis C2 that are produced on the opposed surface 111a and the opposed surface 112a, both being attachment surfaces for attaching the bucket 110. Thus, in the drive transmission device 1 having the bearing 8 interposed between the shaft portion 2 and the housing portion 6, the movement of the housing portion 6 relative to the shaft portion 2 eliminates the need of adjustment of the gaps.

In the embodiment, the shaft portion 2 and the housing portion 6 are provided with the projection 9a on the stepped surface 2e and the concave groove 9b in the end surface 6b, respectively. The distance between the projection 9a and the concave groove 9b can be adjusted appropriately by the movement of the housing portion 6 in the axial direction in attaching the bucket 110, while the distal end of the projection 9a remains positioned in the concave groove 9b. Thus, the sealing performance as the labyrinth seal 9 can be ensured. Therefore, even if there is a risk that the bearing 8 built in to the inner circumference of the housing portion 6 is exposed to, for example, soil and sand during excavation, the labyrinth seal 9 can seal the bearing 8.

This embodiment produces the same advantageous effects as the first embodiment. In addition, this embodiment can produce the advantageous effects of facilitated attachment and reduced impact on defects achieved by improved assembly accuracy.

Third Embodiment

Figure 9:
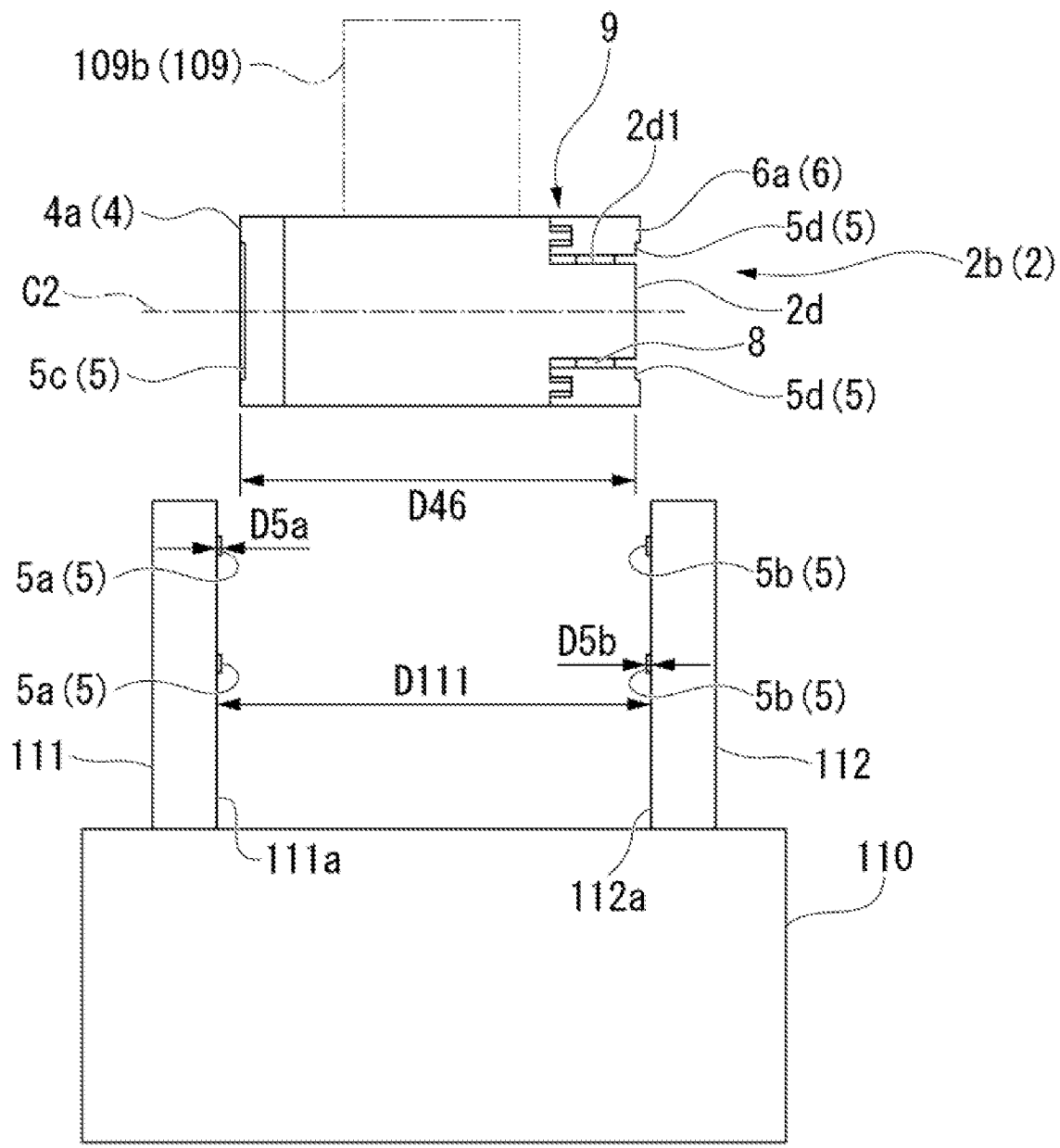
FIG. 9 schematically illustrates dimensions and an assembling process of a drive transmission device according to a third embodiment of the disclosure.

The following describes a drive transmission device relating to a third embodiment of the disclosure with reference to the accompanying drawings. FIG. 9 schematically illustrates dimensions and assembling process of the drive transmission device in the third embodiment of the disclosure. The third embodiment is different from the second embodiment in terms of the projections and the recesses constituting the position regulator 5. The other constituents, which correspond to those in the second embodiment, are denoted by the same reference numerals and are not described here.

As shown in FIG. 9, in the drive transmission device 1 of this embodiment, the position regulator 5 is formed on the opposed surface 111a and the opposed surface 112a. The recess 5c is formed in the end surface 4a of the reduction unit 4. The projection 5a is formed on the opposed surface 111a. The recess 5d is formed in the end surface 6a of the housing portion 6. The projection 5b is formed on the opposed surface 112a.

In the reduction unit attaching step (attaching step), the projection 5a and the recess 5c are aligned with each other, and the projection 5a is fitted into the recess 5c. This accomplishes position restriction between the end surface 4a of the reduction unit 4 and the opposed surface 111a. Further, in the housing portion attaching step (attaching step), the projection 5b and the recess 5d are aligned with each other, and the projection 5b is fitted into the recess 5d. This accomplishes position restriction between the housing portion 6 and the opposed surface 112a.

In the direction along the second rotation axis C2, the sum of the height D5a of the projection 5a and the height D5b of the projection 5b is smaller than the difference between the dimension D46 in the contraction step and the distance D111. Further, the difference between the sum of the height D5a, the height D5b, and the dimension D46 in the contraction step and the distance D111 is smaller than the distance D9 of the gap in the labyrinth seal 9 (see FIG. 3).

According to the embodiment, the position regulator 5 facilitates positioning. Further, the movement of the housing portion 6 in the direction of the second rotation axis C2 by bolt fastening enables adjustment of the gaps in the direction of the second rotation axis C2 that are produced on the opposed surface 111a and the opposed surface 112a, both being attachment surfaces for attaching the bucket 110. Thus, in the drive transmission device 1 having the bearing 8 interposed between the shaft portion 2 and the housing portion 6, the movement of the housing portion 6 relative to the shaft portion 2 eliminates the need of adjustment of the gaps.

In the embodiment, the shaft portion 2 and the housing portion 6 are provided with the projection 9a on the stepped surface 2e and the concave groove 9b in the end surface 6b, respectively. The distance between the projection 9a and the concave groove 9b can be adjusted appropriately by the movement of the housing portion 6 in the axial direction in attaching the bucket 110, while the distal end of the projection 9a remains positioned in the concave groove 9b. Thus, the sealing performance as the labyrinth seal 9 can be ensured. Therefore, even if there is a risk that the bearing 8 built in to the inner circumference of the housing portion 6 is exposed to, for example, soil and sand during excavation, the labyrinth seal 9 can seal the bearing 8.

Accordingly, this embodiment produces the same advantageous effects as the second embodiment.

Fourth Embodiment

Figure 10:
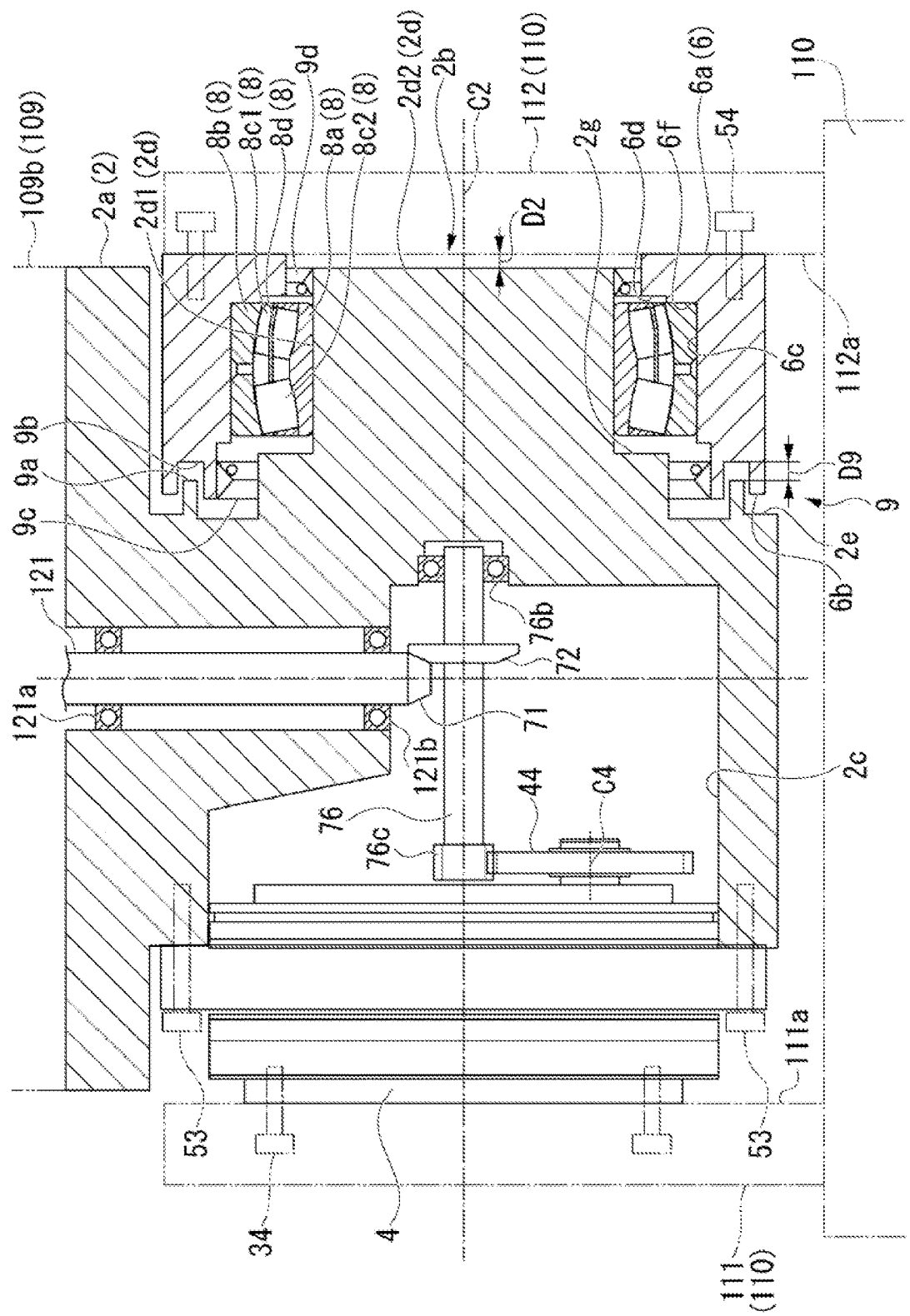
FIG. 10 is an enlarged view of a drive transmission device according to a fourth embodiment of the disclosure.

The following describes a drive transmission device relating to a fourth embodiment of the disclosure with reference to the accompanying drawings. FIG. 10 schematically illustrates the drive transmission device relating to the embodiment. The fourth embodiment is different from the first embodiment in terms of the bearing 8. The constituents other than the bearing 8, which correspond to those in the first embodiment, are denoted by the same reference numerals and are not described here.

As shown in FIG. 10, in the bearing 8 according to this embodiment, the inner circumferential surface of the inner race 8a is loose-fitted to the outer circumferential surface 2d1 of the housing shaft portion 2. The outer circumferential surface of the outer race 8b is tight-fitted to the inner circumferential surface 6c of the housing portion 6.

The end portion of the inner race 8a that is located on the attachment bracket 111 side is spaced apart from a surface 2g of the shaft portion 2. The end portion of the inner race 8a that is located on the attachment bracket 112 side is spaced apart from an inner end surface 6d of the housing portion 6.

The end portion of the outer race 8b that is located on the attachment bracket 111 side is spaced apart from the surface 2g of the shaft portion 2. The end portion of the outer race 8b that is located on the attachment bracket 112 side is in contact with a step 6f formed on the housing portion 6. Accordingly, the end portion of the bearing 8 that is located on the attachment bracket 111 side is spaced apart from the surface 2g of the shaft portion 2.

This configuration in the embodiment allows the bearing 8 to be fitted into the housing portion 6 and assembled to the shaft portion 2 in the preparation step.

This embodiment produces the same advantageous effects as the first embodiment. Further, in this embodiment, an appropriate fit can be selected even if the characteristics of the load on the bearing 8 change depending on the way the load is applied to the joints of the operating unit during actual use of the excavator. This advantageously prevents overload on the bearing 8 and damage to the bearing 8.

In each of the embodiments described above, the first member is the arm 109 and the second member is the bucket 110, but this configuration is not limitative. For example, it is also possible that the first member is the boom 108 and the second member is the arm 109, and the drive transmission device 1 is provided therebetween. Further, it is also possible that the first member is the slewable upper structure (body portion) 103 and the second member is the boom 108, and the drive transmission device 1 is provided therebetween. Furthermore, it is also possible that the first member is the arm 109 and the second member is an attachment for a construction machine other than the bucket 110.

In the embodiments disclosed herein, a member formed of multiple components may be integrated into a single component, or conversely, a member formed of a single component may be divided into multiple components. Irrespective of whether or not the components are integrated, they are acceptable as long as they are configured to attain the object of the invention.

In addition, the present disclosure encompasses the following aspects.

(1) A drive transmission device of the disclosure includes:
a shaft portion rotatable relative to at least two bracket portions that are integrally rotatable about a rotation axis and spaced apart from and opposed to each other along the direction of the rotation axis, the shaft portion being positioned between the bracket portions in the direction of the rotation axis;
a reduction unit attached to the shaft portion and configured to receive a rotational driving force from a drive source through an input portion, the reduction unit having an output portion attached to an opposed surface of a first bracket portion included in the bracket portions, the opposed surface of the first bracket portion being positioned on an inner side in the direction of the rotation axis; and
a housing portion coupled to the shaft portion so as to be rotatable about the rotation axis, the housing portion being attached to an opposed surface of a second bracket portion included in the bracket portions, the opposed surface of the second bracket portion being positioned on an inner side in the direction of the rotation axis.

(2) A construction machine according to the present disclosure includes:
a first member having a drive source for generating a rotational power; and a second member coupled to the first member via a drive transmission device so as to be rotatable about a rotation axis,
wherein the drive transmission device includes:
at least two bracket portions provided on the second member, the at least two bracket portions being spaced apart from and opposed to each other in a direction of the rotation axis;
a shaft portion connected to the first member and positioned between the bracket portions in the direction of the rotation axis;
a reduction unit attached to the shaft portion and configured to receive a rotational driving force from a drive source through an input portion, the reduction unit having an output portion attached to an opposed surface of a first bracket portion included in the bracket portions, the opposed surface of the first bracket portion being positioned on an inner side in the direction of the rotation axis; and
a housing portion coupled to the shaft portion so as to be rotatable about the rotation axis, the housing portion being attached to an opposed surface of a second bracket portion included in the bracket portions, the opposed surface of the second bracket portion being positioned on an inner side in the direction of the rotation axis,
wherein the shaft portion and the housing portion are movable relative to each other in the direction of the rotation axis,
wherein the housing portion is shaped like a ring and fitted around the shaft portion,
wherein a gap is formed between an outer circumference of the housing portion and an outer circumference of the shaft portion in the direction of the rotation axis, and
wherein a labyrinth seal is provided in the gap formed between the outer circumference of the housing portion and the outer circumference of the shaft portion.

What is claimed is:

1. A drive transmission device, comprising;
a shaft portion;
a reduction unit attached to the shaft portion; and
a housing portion coupled to the shaft portion so as to be rotatable about a rotation axis of an output of the reduction unit, the housing portion being attached to a first bracket portion,
wherein the reduction unit includes:
an input portion configured to receive a rotational driving force from a drive source; and
an output portion configured to decelerate a rotation of the rotational driving force and to output the decelerated rotation, wherein the output portion is attached to a second bracket portion, the second bracket portion being disposed opposite to the first bracket portion with a space therebetween in a direction of the rotation axis and rotating in the same direction as the first bracket portion around the rotation axis in synchronization with the first bracket portion, and wherein the entire reduction unit is provided between the first bracket portion and the second bracket portion in the rotation axis.

2. The drive transmission device of claim 1, wherein the shaft portion and the housing portion are movable relative to each other in the direction of the rotation axis.

3. The drive transmission device of claim 2, wherein the housing portion is shaped like a ring and fitted around the shaft portion, and wherein a gap is formed between an outer circumference of the housing portion and an outer circumference of the shaft portion in the direction of the rotation axis.

4. The drive transmission device of claim 3, wherein a labyrinth seal is provided between the outer circumference of the housing portion and the outer circumference of the shaft portion.

5. The drive transmission device of claim 3, wherein an opposed surface of at least one of the first bracket portion and the second bracket portion has an assembly position regulator provided thereon, the assembly position regulator having a predetermined height toward an inside along the rotation axis, and wherein a distance of the gap is larger than the height of the assembly position regulator in the direction of the rotation axis.

6. The drive transmission device of claim 2, wherein a bearing is provided between the housing portion and the shaft portion, and wherein the bearing is tight-fitted to either one of the housing portion and the shaft portion and loose-fitted to the other.

7. The drive transmission device of claim 1, wherein a diameter of connection positions between the housing portion and the first bracket portion around the rotation axis is equal to a diameter of connection positions between the reduction unit and the second bracket portion around the rotation axis.

8. The drive transmission device of claim 1, further comprising a transmission shaft and an operation output shaft configured to transmit the rotational driving force from the drive source to the reduction unit, wherein the shaft portion has an internal space in which an opening is toward the second bracket, wherein the reduction unit is attached to the opening of the internal space, wherein the transmission shaft is arranged orthogonally to the rotation axis and rotates with the rotation of the drive source, and wherein the operation output shaft is arranged coaxially to the rotation axis and is arranged in the internal space, and rotates with the rotation of the transmission shaft to transmit the rotational driving force from the drive source to the reduction unit.

9. A construction machine comprising:
a shaft portion;
a reduction unit attached to the shaft portion; and
a housing portion coupled to the shaft portion so as to be rotatable about a rotation axis, the housing portion being attached to a first bracket portion,
wherein the reduction unit includes:

an input portion configured to receive a rotational driving force from a drive source; and an output portion configured to decelerate a rotation of the rotational driving force and to output the decelerated rotation, wherein the second bracket portion is disposed opposite to the first bracket portion with a space therebetween in a direction of the rotation axis and rotating in the same direction as the first bracket portion around the rotation axis in synchronization with the first bracket portion, wherein the output portion is attached to the second bracket portion, wherein the shaft portion and the housing portion are movable relative to each other in the direction of the rotation axis, wherein the housing portion is shaped like a ring and fitted around the shaft portion, wherein a gap is formed between an outer circumference of the housing portion and an outer circumference of the shaft portion in the direction of the rotation axis, wherein a labyrinth seal is provided between the outer circumference of the housing portion and the outer circumference of the shaft portion, wherein an opposed surface of at least one of the first bracket portion and the second bracket portion has an assembly position regulator provided thereon, the assembly position regulator having a predetermined height toward an inside along the rotation axis, wherein a distance of the gap is larger than the height of the assembly position regulator in the direction of the rotation axis, wherein a bearing is provided between the housing portion and the shaft portion, wherein the bearing is tight-fitted to either one of the housing portion and the shaft portion and loose-fitted to the other, wherein a diameter of connection positions between the housing portion and the first bracket portion around the rotation axis is equal to a diameter of connection positions between the reduction unit and the second bracket portion around the rotation axis, and wherein the entire reduction unit is provided between the first bracket portion and the second bracket portion in the rotation axis.

10. A method of assembling the construction machine of claim 9, comprising:

a contraction step of bringing the housing portion and the shaft portion closer to each other in the direction of the rotation axis to contract the gap formed between the housing portion and the shaft portion;

an insertion step of inserting, after the contraction step, the shaft portion between the bracket portions from a direction intersecting the rotation axis;

an extension step of spacing, after the insertion step, the housing portion and the shaft portion apart from each other in the direction of the rotation axis to extend the gap formed between the housing portion and the shaft portion;

an attaching step of attaching the output portion of the reduction unit to the opposed surface of the second bracket portion positioned on an inner side in the direction of the rotation axis; and an attaching step of attaching the housing portion to the opposed surface of the first bracket portion positioned on an inner side in the direction of the rotation axis.

11. The construction machine of claim 9, further comprising a transmission shaft and an operation output shaft configured to transmit the rotational driving force from the drive source to the reduction unit,
   wherein the shaft portion has an internal space in which an opening is toward the second bracket,
   wherein the reduction unit is attached to the opening of the internal space,
   wherein the transmission shaft is arranged orthogonally to the rotation axis and rotates with the rotation of the drive source, and
   wherein the operation output shaft is arranged coaxially to the rotation axis and is arranged in the internal space, and rotates with the rotation of the transmission shaft to transmit the rotational driving force from the drive source to the reduction unit.

* * * * *